United States Patent [19]

Maeda et al.

[11] 4,120,036

[45] Oct. 10, 1978

[54] TIME INFORMATION CORRECTION IN COMBINATION TIMEPIECE AND CALCULATOR

[75] Inventors: Hidetoshi Maeda, Tenri; Takehiko Sasaki, Yamatokoriyama, both of Japan

[73] Assignee: Sharp Kabushiki Kaisha, Osaka, Japan

[21] Appl. No.: 720,205

[22] Filed: Sep. 3, 1976

[30] Foreign Application Priority Data

Sep. 5, 1975 [JP] Japan .......................... 50-122917[U]
Apr. 2, 1976 [JP] Japan .......................... 51-37371

[51] Int. Cl.[2] .......................... G04B 47/00; G06F 7/38

[52] U.S. Cl. .......................... 364/705; 58/4 A; 58/50 R; 58/58; 58/85.5; 58/152 R

[58] Field of Search .......... 235/156, 152; 58/152 R, 58/85.5, 58, 4 R, 4 A, 50 R; 364/705

[56] References Cited

U.S. PATENT DOCUMENTS

| | | | |
|---|---|---|---|
| 3,813,533 | 5/1974 | Cone et al. | 235/156 |
| 3,834,152 | 9/1974 | Izuhiko et al. | 58/23 R |
| 3,879,618 | 4/1975 | Larson | 340/365 R |
| 3,922,842 | 12/1975 | Kinji | 58/4 A |
| 3,928,960 | 12/1975 | Reese | 58/152 R |
| 3,955,355 | 5/1976 | Lucy | 58/50 R |
| 3,982,387 | 9/1976 | Tanaka | 58/50 R |
| 4,019,037 | 4/1977 | Monna | 235/156 |
| 4,047,010 | 9/1977 | Perotto | 364/705 |

FOREIGN PATENT DOCUMENTS

| | | | |
|---|---|---|---|
| 1,391,637 | 4/1975 | United Kingdom | 58/152 |

*Primary Examiner*—David H. Malzahn
*Attorney, Agent, or Firm*—Birch, Stewart, Kolasch & Birch

[57] ABSTRACT

A mode selection switch is provided for selectively enabling a time information display, namely, a timepiece mode, and a calculator operation, namely, a calculator mode. Function keys for the calculator operation are adapted to select a desired time information section, for example, the date information section, the hour information section, and the minute information section during the timepiece mode, thereby resetting the time information stored in the selected information section to zero. Thereafter, a desired value is introduced into the selected information section through numeral keys for the calculator operation.

9 Claims, 7 Drawing Figures

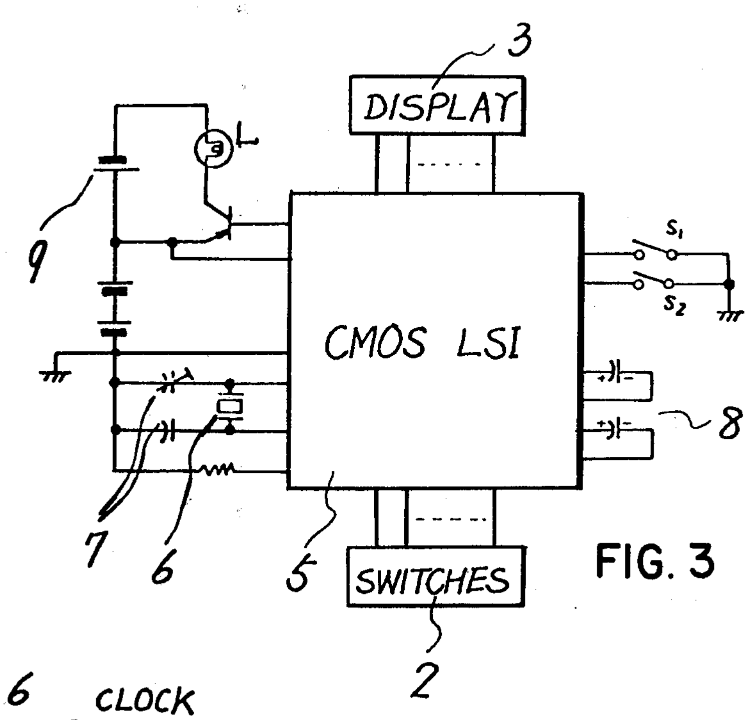
FIG. 3
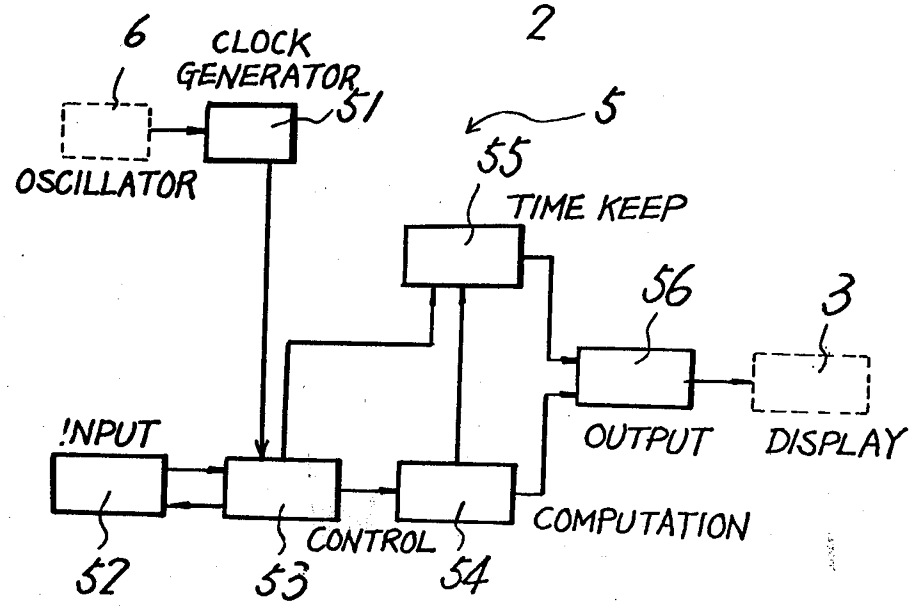
FIG. 4 (CMOS LSI -5-)

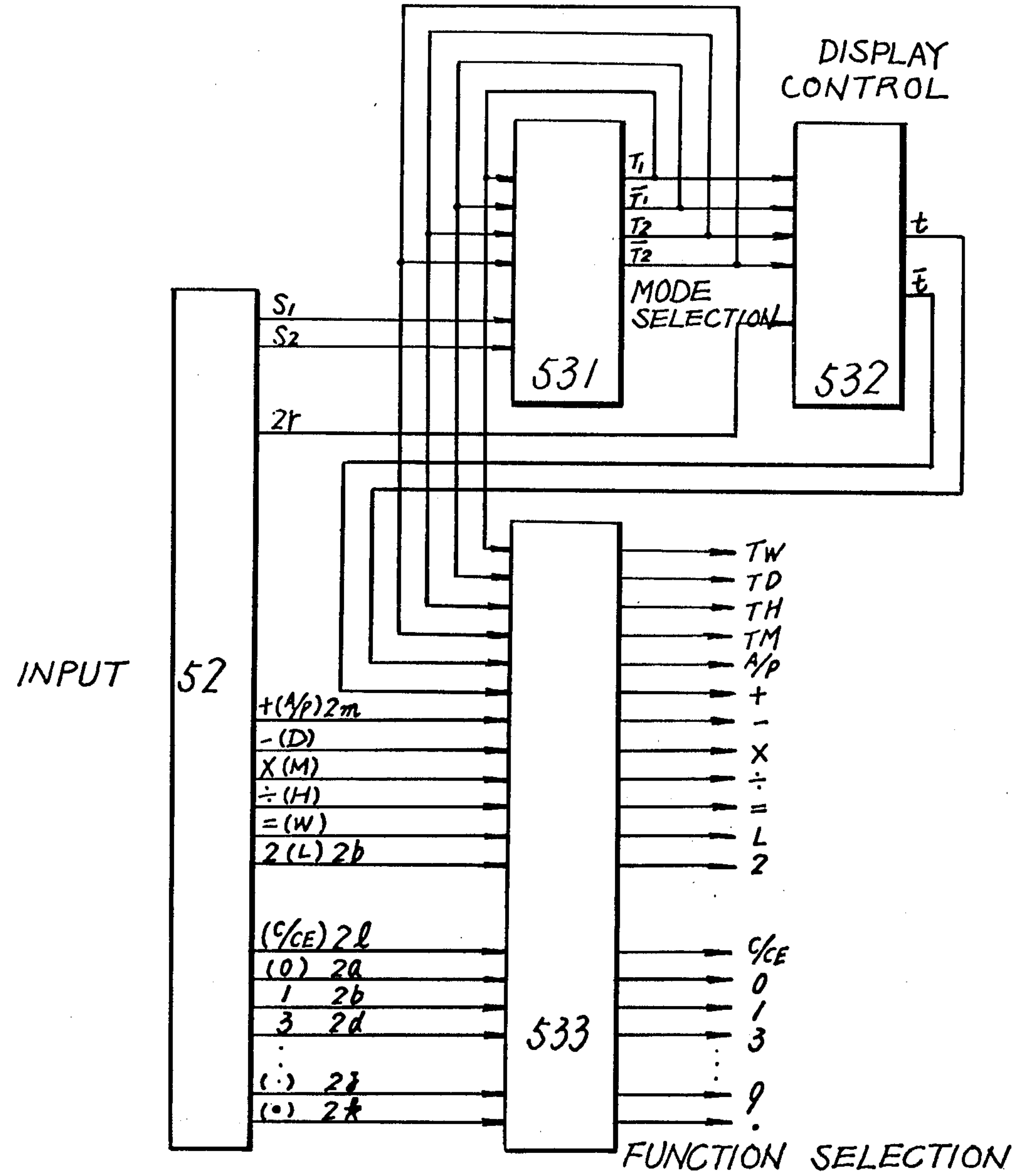
FIG. 5 (CONTROL CIRCUIT -53-)

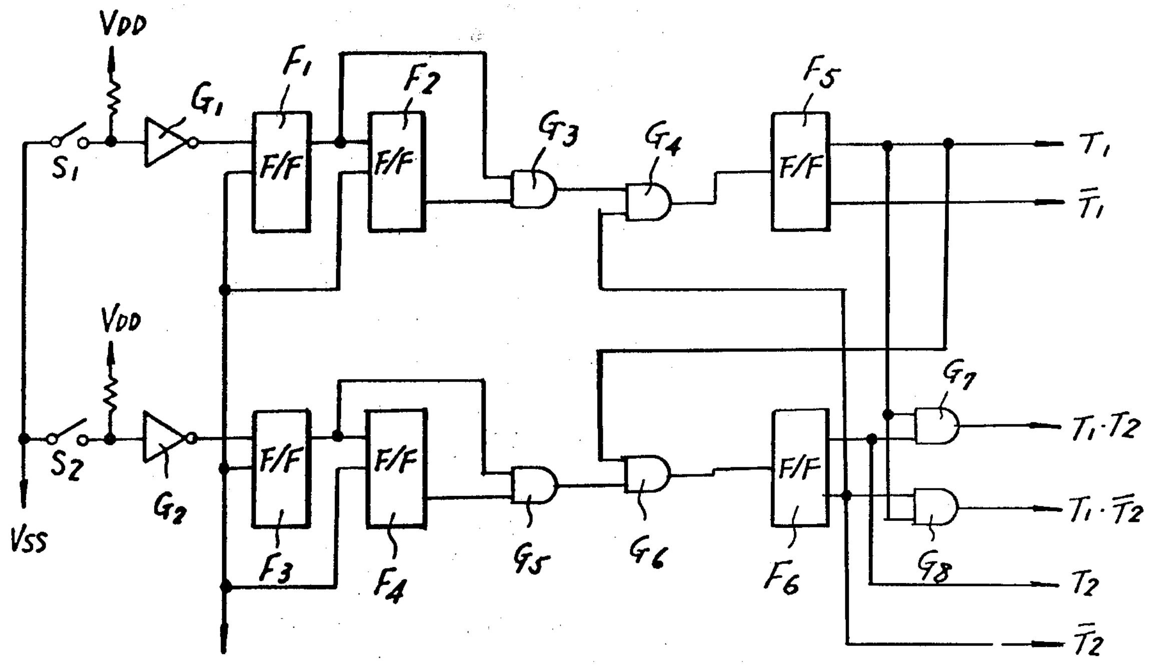
FIG. 6 (MODE SELECTION -531-)
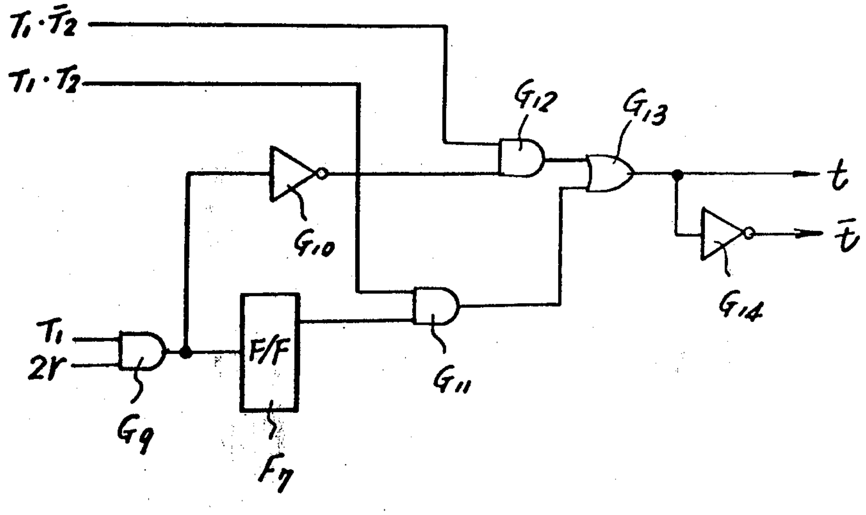
FIG. 7 (DISPLAY CONTROL -532)

TIME INFORMATION CORRECTION IN COMBINATION TIMEPIECE AND CALCULATOR

BACKGROUND AND SUMMARY OF THE INVENTION

The present invention relates to a combination timepiece and calculator and, more particularly, to a time information correction system in a combination timepiece and calculator.

The time information correction operation becomes unavoidably complicated when the timepiece stores much information as, for example, dates, days of the week, hours, minutes and seconds. In a combination timepiece and calculator, it is of great importance to effectively combine the calculator operation and the timepiece operation.

Accordingly, an object of the present invention is to provide a novel time information correction system in a combination timepiece and calculator.

Another object of the present invention is to provide a time information correction system in a combination timeplace and calculator which utilizes function keys and numeral keys from the calculator operation.

Other objects and further scope of applicability of the present invention will become apparent from the detailed description given thereafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a mode selection switch is provided for selectively enabling a time information display, namely, a timepiece mode, and a calculator operation, namely a calculator mode. Function keys for the calculator operation are adapted to select a desired time information section, for example, the date information section, the hour information section, and the minute information section included within a time information keeping circuit when the combination timpiece and calculator is in the timepiece mode.

When a desired time information section is selected for time information correction purposes, the information stored in the selected section is reset to zero. Thereafter a desired value is introduced into the selected information section through numeral keys for the calculator operation or a rapid advance switch. Decimal points provided for the calculator operation are adapted to indicate days of week in the timpiece mode.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIG. 3 is a schematic block diagram of the combination timepiece and calculator of FIG. 1, which includes a CMOS LSI;

FIG. 4 is a block diagram of the CMOS LSI included within the combination timepiece and calculator of FIG. 3;

FIG. 5 is a block diagram of a control circuit included within the CMOS LSI of FIG. 4;

FIG. 6 is a circuit diagram of a mode selection circuit included within the control circuit of FIG. 5; and FIG. 7 is circuit diagram of a display control circuit included within the control circuit of FIG. 5.

DESCRIPTION OF THE PREFERRED EMBODIMENTS

Figure 1:
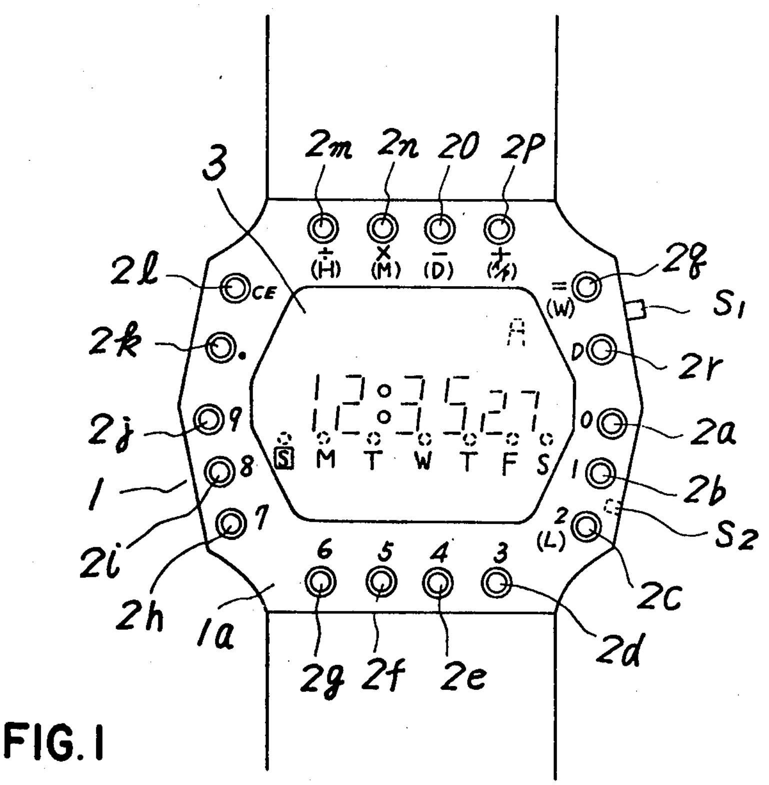
FIG. 1 is a plan view of a combination timepiece and calculator employing an embodiment of a time information correction system of the present invenstion.

FIG. 1 shows a combination timepiece and calculator of the present invention. On the front metal surface of a combination timepiece and calculator 1, 18 switches *2a* through *2r* are formed in such a manner as to surround a display 3.

Figure 2:
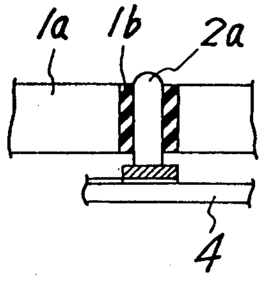
FIG. 2 is a sectional view of an embodiment of a switching structure employed in the combination timepiece and calculator of FIG. 1.

The switches *2a* through *2r* can be conventional mechanical switches or touch sensitive electronic switches. FIG. 2 shows a touch sensitive electronic switch structure, wherein an input signal is developed by connecting the touch electrodes *2a* through *2r* with a metal casing *1a* through an operator's body. The touch electrodes *2a* through *2r* are electrically isolated from the metal casing *1a* via insulating packings *1b*. The insulating packings *1b* function also to provide a gastight casing for the combination timepiece and calculator. One end of each of the touch electrodes *2a* through *2r* is connected to wiring patterns formed on a substance 4 on which circuit elements are mounted.

Ten switches *2a* through *2j* function as numeral keys for introducing numeral information into the combination timepiece and calculator either in a timepiece mode or a calculator mode. The switch *2k* is a decimal point key, the switch *2l* is a clear key, and the switches *2m* through *2q* are function keys. The function keys *2m* through *2q* are adapted to develop operation commands, that is, ÷, ×, −, +, and =, respectively, in the calculator mode. Moreover, the function keys *2m* through *2q* are adapted to select a desired time information section, that is, an hour information section, a minute information section, a date information section, an AM/PM information section, and a day of the week information section, respectively, in the timepiece mode.

A mode selection switch S1 is provided for selectively enabling the above-mentioned calculator mode and timepiece mode. A remaining switch *2r* is operative only in the timepiece mode. The operation of the switch *2r* will be described later. A correction mode switch S2 is further provided for placing the combination timepiece and calculator into a time information correction mode.

The display 3 can be made of a liquid crystal display device, light-emitting diodes, or an electrochromic display device. The display 3 is positioned in the center of the front panel of the combination timepiece and calculator and comprises 6 digits for displaying time information in the timepiece mode and calculation results in the calculator mode. The day of the week information is displayed through the use of decimal points in the timepiece mode.

FIG. 3 shows a circuit block of the combination timepiece and calculator of the present invention. The circuit mainly comprises a CMOS LSI 5 which includes timepiece circuitry and calculator circuitry. The CMOS LSI 5 is connected to receive input signals from the above-mentioned switches *2a* through *2r*, and the mode switches S1 and S2. The contents of the CMOS LSI 5 are displayed on the display 3. A lamp L is provided for illuminating the display 3 when the display 3 is made of a liquid crystal display device.

The CMOS LSI 5 is further connected to crystal oscillation circuitry including a crystal oscillator 6 and capacitors 7 for adjusting a clock phase, a booster including capacitors 8, and a power source battery 9. The crystal oscillation circuitry develops a base frequency signal of 32,768 Hz for the timepiece operation and a clock signal for controlling the calculator operation.

FIG. 4 schematically shows a construction of the CMOS LSI 5. A clock generator 51 receives the base frequency signal from the crystal oscillator 6, and develops a reference signal for the timepiece operation and a clock signal for the calculator operation. An input stage 52 generates an input signal in response to the operation of the input switches formed on the front panel of the combination timepiece and calculator. A control circuit 53 is connected to receive the input signal from the input stage 52 and the reference signal or the clock signal from the clock generator 51. A computation circuit 54 performs the arithmetic operation for the calculator, and a time keeping circuit 55 stores time information. An output stage 56, which is a decoder/driver, is connected to receive the time information from the time keeping circuit 55 or the calculation results from the computation circuit 54 and decodes the signal into a form suited for the display 3.

When the combination timepiece and calculator is in the timepiece mode, the time keeping circuit 55 receives a reference signal of 1 Hz via the clock generator 51, the control circuit 53 and the computation circuit 54, whereby the contents of a second information register included within the time keeping circuit 55 are increased by one every one second interval. The time information stored in the time keeping circuit 55 is displayed on the display 3 via the output stage 56.

When the correction mode switch S2 is depressed, the combination timepiece and calculator is placed in the time information correction mode. In this mode, a desired time information section is selected for correction purposes through the use of the function keys and a desired value is introduced into the selected section in the time keeping circuit 55 through the numeral keys, the input stage 52, the control circuit 53 and the computation circuit 54. Thus introduced information is displayed on the display 3 via the output stage 56.

In the calculator mode, the computation circuit 54 operates in the same manner as the conventional computation circuit of the electronic calculator, and the computation results are displayed on the display 3 via the output stage 56. At this moment, the time keeping circuit 55 continues its time keeping operation without display.

FIG. 5 shows the relationship between the input stage 52 and the control circuit 53. Output signals of the mode selection switch S1 and the correction mode switch S2 are applied to a mode selection circuit 531, which develops a timepiece mode signal T1, a calculator mode signal T1, a time information correction mode signal T2, and a time information noncorrection mode signal T2 to a display control circuit 532 and a function selection circuit 533 in response to the conditions of the switches S1 and S2.

The display control circuit 532 is connected to further receive the output signal of the switch 2R, which is operative only in the timepiece mode, and develops a first display command *t* for enabling the display of time information as to hours, minutes and seconds, and a second display command *t* for enabling the display of time information as to dates and days of the week to the function selection circuit 533.

The function selection circuit 533 receives the output signals of the switches 2*a* through 2*q*, the mode selection circuit 531, and the display control circuit 532, and develops function signals such as operation commands and numeral information. TW is a correction command for correcting the time information as to days of the week, TD is a correction command for correcting the time information as to dates, TH is a correction command for correcting the time information as to hours, and TM is a correction command for correcting the time information as to minutes.

FIG. 6 shows a typical circuit construction of the mode selection circuit 531. The mode selection switch S1 is provided for selectively enabling the timepiece mode and the calculator mode. The correction mode switch S2 is provided for enabling the time information correction mode at a desired time.

Flip-flops F1 and F2 and an AND gate G3 form, in combination, a pulse generator which develops one pulse for every depression of the mode selection switch S1. When the mode selection switch S1 is depressed in the time information noncorrection mode T1 · $T_2$, one pulse is introduced into a flip-flop F5 through an AND gate G4, and the flip-flop F5 is inverted to develop the calculator mode signal T1. The flip-flop F5 is not inverted even when the mode selection switch S1 is depressed in the time information correction mode T1 · T2, since the AND gate G4 is not conductive in this condition. Contrarily, the flip-flop F5 is inverted to development the timepiece mode signal T1 when the mode selection switch S1 is depressed in the calculator mode, because the AND get G4 is conductive in the calculator mode.

Flip-flops F3 and F4 and an AND gate G5 form, in combination, a pulse generator which develops one pulse for every depression of the correction mode switch S2. An AND gate G6 is conductive in the timepiece mode T1 and, therefore, a flip-flop F6 is inverted every depression of the correction mode switch S2, thereby developing the correction mode signal T2 or the noncorrection mode signal T2 in response to the depression of the correction mode switch S2. AND gates G7 and G8 function to develop the timepiece/-time information correction mode signal T1 · T2, and the timepiece/time information noncorrection mode signal T1 · T2 with the use of the correction mode signal T2, the noncorrection mode signal T2, and the timepiece mode signal T1.

FIG. 7 shows a typical circuit construction of the display control circuit 532. In the timepiece/time information noncorrection mode, the signal T1 · T2 bears the logical value "1". In this condition, when the output signal of the switch 2*r* is not developed, an output signal of an AND gate G9 is "0" and, hence, output signals on an inverter G10, an AND gate G12 and an OR gate G13 are "1". Therefore, the first display command *t* is "1", thereby enabling the display as to hours, minutes and seconds.

When the output signal is derived from the switch 2*r*, the output signal of the AND gate G9 is "1" and, hence, the output signals of the inverter G10, the AND gate G12 and the OR gate G13 are "0". Therefore, an output signal of an inverter G14 is "1". It will be clear from the foregoing description that the second display command *t* is "1" during the time period when the output signal is developed from the switch 2*r*, thereby enabling the time information display as to dates and days of the week.

More particularly, in the timepiece/time information noncorrection mode, the display 3 usually displays the time information as to hours, minutes and seconds, and displays the time information as to dates and days of the week during the time period when the switch 2*r* is activated.

In the timepiece/time information correction mode, the signal T1 · T2 is "1" and, therefore, an AND gate G11 is conductive. Under these conditions, the condition of a flip-flop F7 is inverted upon every development of the output signal from the switch 2*r* and, therefore, output signals of the AND gate G11 and the OR gate G13 is changed from "1" to "0" or from "0" to "1" upon every development of the output signal from the switch 2*r*. That is, the display is changed from the information as to hours, minutes and seconds to the information as to dates and days of the week, or changed from the information as to dates and days of the week to the information as to hours, minutes and seconds upon every activation of the switch 2*r* in the timepiece/time information correction mode. The above-mentioned inversion of the display is achieved only in the timpiece mode, or, when the signal T1 is "1", by the provision of the AND gate G9.

The display 3 indicates "A" before noon and "P" after midday in the timepiece/time information correction mode, that is, when the output of the AND gate G7 included within the mode selection circuit 531 is "1".

The function selection circuit 533 comprises selection gate circuits. As already discussed, the function keys 2*m* ( ÷ (H) ), 2*n* ( × (M)), 2*o* ( − (D)), 2*p* ( + (A/P)) and 2*q* ( = (W)) develop different commands in the timepiece mode and the calculator mode, respectively. That is, the function keys 2*m* through 2*q* develop calculator operation commands ÷, ×, −, + and = in the calculator mode, or, when the signal T1 is "1", and develop the time information section selection commands H, M, D, A/P and W, respectively, in the timepiece/time information correction mode, or, when the signal T1 · T2 is "1". Moreover, the signals TH, TM and A/P can be developed only when the signal *t* is "1" and the information as to hours, minutes and seconds is displayed on the display 3. The signals TD and TW can be developed only when the signal *t* is "1" and the information as to dates and days of the week is displayed on the display 3.

The numeral key 2*c* (2 (L)) is adapted to develop a lamp enabling signal L for activating the illumination lamp L in the timepiece/time information noncorrection mode, or, when the signal T1 · T2 is "1". The numeral key 2*c* is adapted to develop a signal associated with the numeral 2 in the timepiece/time information correction mode (T1 · T2 is "1") and in the calculator mode (T1 is "1").

The decimal point key 2*k* and the clear key 2*l* can develop their signals through the function selection circuit 533 only when the signal T1 is "1", or, in the calculator mode.

The numeral keys 2*a*, 2*b*, and 2*d* through 2*j* develop numeral information signals 0, 1, and 3 through 9 via the function selection circuit 533 in the calculator mode (T1 is "1") and in the timepiece/time information correction mode (T1 · T2 is "1").

When a time information correction operation is desired, the mode selection switch S1 is placed in the timepiece mode, and the correction mode switch S2 is placed in the correction mode. The information section to be corrected is selected by the function keys 2*m* through 2*o*, whereby the function selection circuit 533 develops the signal TH, TM or TD in response to the function keys 2*m* through 2*o*, respectively. The thus developed signal TH, TM or TD is applied to the computation circuit 54 in order to automatically clear the information stored in the hour information register, the minute information register or the day information register included within the time keeping circuit 55. The thus cleared condition is displayed on the display 3 as "00" at the corresponding display section through the output stage 56. Thereafter, a desired value is introduced into the computation circuit 54 via the numeral keys 2*a* through 2*j*, and the introduced value is conveyed to the corresponding register in the time keeping circuit 55.

The information stored in the register for days of the week is counted up by one upon every development of the TW signal. The information as to days of the week is displayed through the use of decimal points. The display 3 has 7 decimal points in response to the 6 digits numeral positions, which indicate the decimal points in the calculator mode, and the information as to days of the week in the timepiece mode.

It will be clear from FIG. 6 that, in the noncorrection mode (T2 is "1"), the timepiece mode and the calculator mode are alternatively enabled by depressing the mode selection switch S1. Simultaneously, the display is alternatively changed between the time information (hours, minutes, and seconds) and the computation results. When the combination timepiece and calculator of the present invention is changed from the timepiece mode to the calculator mode, the display indicates zero and a decimal point (0.) at the first digit, thereby showing the fact that the operation mode is changed to the calculator mode. The time keeping operation is, of course, continuously performed either in the timepiece mode or in the calculator mode.

The operation is not changed to the calculator mode even when the mode selection switch S1 is depressed in the timepiece/time information correction mode because of the provision of the AND gate G4.

The correction mode switch S2 controls the noncorrection mode and the correction mode in the timepiece mode. When the system is in the timepiece/time information correction mode, the display indicates A or P at the upper right corner of the display 3, thereby showing the fact that the correction operation can be achieved. The above-mentioned indication is enabled without regard to the fact that the indication is enabled for the information as to hours, minutes and seconds, or as to dates and days of the week. The normal time keep operation is continuously performed even in the correction mode before the correction section is selected through the use of function keys 2*m* through 2*q*.

When the correction mode switch S2 is depressed in the timepiece/time information correction mode, the system is shifted to the noncorrection mode and the display 3 indicates the information as to hours, minutes and seconds.

The correction of the information as to hours is achieved in the following manner.

First, the system is placed in the timepiece/time information correction mode through the use of two mode switches S1 and S2. And the display of the information as to hours, minutes and seconds is selected through the use of the switch 2r.

When the switch 2m ( ÷ (H)) is enabled, the signal TH is developed and the hour information section is automatically resetted to zero, or, "00". Thereafter, a desired value is introduced into the hour information section through the use of numeral keys 2a through 2j. Such information is displayed on the display 3 at the hour information digits. AM and PM are alternatively changed upon every enablement of the switch 2p ( + (A/P)). After completion of the hour information correction, the correction mode switch S2 is depressed, whereby the system is changed from the timepiece/time information correction mode to the timepiece/time information noncorrection mode. At this moment, the indication A or P disappears. During these operations, the second registor and the minute register perform their usual operations.

The correction of the information as to minutes is achieved in the following manner.

First, the system is placed in the timepiece/time information correction mode, and the display of the information as to hours, minutes and seconds is enabled. When the switch 2n ( × (M)) is enabled, the signal TM is developed and the minute information section and the second information section are resetted to zero, or, "00" minutes "00" seconds. At this moment the second counter ceases its usual counting operation. Thereafter, a desired value is introduced into the minute information section through the use of the numeral keys 2a through 2j. Thus introduced value is indicated on the display 3. After completion of the minute information setting, the correction mode switch S2 is depressed in response to the time tone, thereby placing the system in the timepiece/time information noncorrection mode. During the above-mentioned correction operation, the function keys 2o and 2q are not operative.

The correction of the information as to dates is achieved in the following manner.

The system is placed in the timepiece/time information correction mode, and the display of the information as to dates and days of the week is selected. When the function key 2o ( − (D)) is enabled, the signal TD is developed, and the date information section is resetted to zero, or, "00", which is indicated on the display 3. Thereafter, a desired value is introduced into the date information section through the use of the numeral keys 2a through 2j. After completion of the date information setting, the correction mode switch S2 is depressed in order to place the system in the timepiece/time information noncorrection mode, whereby the display 3 indicates the information as to hours, minutes and seconds.

The correction of the information as to days of the week is achieved in the following manner.

The system is placed in the timepiece/time information correction mode, and the display of the information as to dates and days of the week is selected. The dot indication of the information as to days of the week is shifted right by one upon every enablement of the function key 2q ( = (W)). When the correction is completed, the correction mode switch S2 is depressed, thereby placing the system in the timepiece/time information noncorrection mode. During the correction of the information as to dates and days of the week, the function keys 2m and 2n are not operative.

In the normal timepiece mode, or, the timepiece/time information noncorrection mode, it will be clear from FIG. 7 that the information as to hours, minutes and seconds is usually displayed. The information as to dates and days of the week is displayed only during the enablement of the switch 2r. In the timepiece/time information correction mode, the information displayed on the display 3 is alternatively changed upon every enablement of the switch 2r between the information as to hours, minutes and seconds, and the information as to dates and days of the week. The switch 2r is operative only in the timepiece mode.

Although in the foregoing embodiments time information setting is achieved through the use of the numeral keys, a rapid advance switch can be provided for rapidly advancing the information stored in the date register, the hour register or the minute register by applying them a reference signal of one hertz.

The invention being thus described, it will be obvious that the same may be varied in many ways. Such variations are not to be regarded as a departure from the spirit and scope of the invention.

What is claimed is:

1. In a combination timepiece and calculator including numeral keys for introducing numeral information into the combination timepiece and calculator, function keys for introducing operation commands into the combination timepiece and calculator, a base frequency signal generator, a power source, a computation circuit for calculator operation, a time information keeping circuit for timepiece operation having a plurality of time information sections including at least an hour information section and a minute information section, and a digital display for displaying the information stored in the computation circuit and the time information keeping circuit, the improvement comprising:

a. a mode selection switch for alternatively activating said computation circuit for calculator operation and said digital display for displaying time information;

b. a selection means for selecting a desired one of at least said hour and minute information sections, in the time information keeping circuit;

c. a time information correction command generator for resetting the information stored in said selected section of the time information keeping circuit to zero; and d. a time information setting means for introducing a desired value into only said desired one selected section of the time information keeping circuit.

2. The combination timepiece and calculator of claim 1, which further comprises:

e. a correction mode selection switch;

f. a mode selection circuit for determining an operation mode of the combination timepiece and calculator in accordance with the conditions of the mode selection switch and the correction mode selection switch; and g. a display control means for selecting a display condition on the digital display in response to the operation mode determined by the mode selection circuit.

3. The combination timepiece and calculator of claim 1, wherein said function keys comprise a portion of said selection means.

4. The combination timepiece and calculator of claim 3, wherein the function keys are utilized to initiate the development of arithmetic operation commands when the combination timepiece and calculator is activated for calculator operation by said mode selection switch, and are utilized to initiate the development of signals by the remaining portion of said selection means for selecting the desired information section in the time information keeping circuit.

5. The combination timepiece and calculator of claim 3, wherein the function keys are touch sensitive electronic switches.

6. The combination timepiece and calculator of claim 1, wherein the time information setting means comprises the numeral keys.

7. The combination timepiece and calculator of claim 6, wherein the numeral keys are made of touch sensitive electronic switches.

8. The combination timepiece and calculator of claim 1, wherein the digital display comprises six digit positions and seven decimal points.

9. The combination timepiece and calculator of claim 8, wherein means are provided to selectively illuminate said decimal points to indicate information as to days of the week in the timepiece mode.

* * * * *